United States Patent
McSweyn et al.

(10) Patent No.: US 7,868,589 B2
(45) Date of Patent: Jan. 11, 2011

(54) PORTABLE MEDIA PLAYER CORDLESS CHARGER

(75) Inventors: Christopher Michael McSweyn, Venice, CA (US); Kasidy Alves, Oxnard, CA (US)

(73) Assignee: Scosche Industries, Inc., Oxnard, CA (US)

( * ) Notice: Subject to any disclaimer, the term of this patent is extended or adjusted under 35 U.S.C. 154(b) by 293 days.

(21) Appl. No.: 12/050,363

(22) Filed: Mar. 18, 2008

(65) Prior Publication Data

US 2009/0237031 A1 Sep. 24, 2009

(51) Int. Cl.
*H02J 7/00* (2006.01)
*H02J 7/02* (2006.01)

(52) U.S. Cl. .................. 320/114; 320/115; 320/107; 320/111

(58) Field of Classification Search .......... 320/107, 320/111, 112, 113, 114, 115
See application file for complete search history.

(56) References Cited

U.S. PATENT DOCUMENTS

| | | | |
|---|---|---|---|
| 7,663,879 B2* | 2/2010 | Richardson et al. | 361/679.56 |
| 2003/0218445 A1* | 11/2003 | Behar | 320/114 |
| 2005/0093511 A1* | 5/2005 | Wu | 320/114 |
| 2005/0239434 A1* | 10/2005 | Marlowe | 455/345 |
| 2005/0265569 A1* | 12/2005 | Langberg et al. | 381/334 |
| 2008/0307144 A1* | 12/2008 | Minoo | 710/304 |
| 2009/0009957 A1* | 1/2009 | Crooijmans et al. | 361/686 |

* cited by examiner

*Primary Examiner*—Edward Tso
*Assistant Examiner*—Ahmed Omar
(74) *Attorney, Agent, or Firm*—Arent Fox LLP

(57) ABSTRACT

Various embodiments of a cordless charging device and a method for charging a portable media player are provided. Among other things, the charging device is compact and portable so that it can easily be stowed for transport, greatly enhancing a customer's ability to use the primary portable media player without all of the problems associated with recharging, including cables that inevitably accompany a docking station device. Features of the device include collapsible prongs and a hinged arm that radially releases from the body to reveal a docking connector for charging a portable media player.

35 Claims, 4 Drawing Sheets

PORTABLE MEDIA PLAYER CORDLESS CHARGER

BACKGROUND

1. Field

The disclosure relates to the field of portable media players and, in particular, to a cordless charging device and associated methods for charging a portable media player battery.

2. Background

Recharging portable media players is currently accomplished under the docking station concept. A portable media player is placed into a docking station device (docked) and the docking station device is separately plugged into a power source through either a power cable or through a USB connection to a computer. In all cases, the docking station device always plugs in through use of a cable for recharging the battery of the portable media player.

The dependence of people on an enormous variety of portable electronic devices for both business and personal use is continuously expanding. The portability of these devices allows us to communicate or enjoy music and video, for example, without the prior restraints of power cables or phone cables. Although improving battery technology has played a big part in this transformation, the inevitable battery recharge is still a very pertinent aspect of any portable device. Particularly for travelers, this means traveling, not only with the primary device itself, but also packing up a docking station device and the associated cables for plugging the docking station device into a power source.

SUMMARY

In one aspect of the disclosure, a cordless charging device includes a body having at least one prong configured to be connected to an AC power source and a docking connector configured to receive a portable media player, the docking connector being electrically connected to said at least one prong.

In another aspect of the disclosure, a method for charging a portable media player with a cordless charging device comprising a body having at least one prong and a docking connector electrically connected to said at least one prong is disclosed. The method includes connecting said at least one prong to an AC power source, and placing a portable media player onto the docking connector.

In a further aspect of the disclosure, a cordless charging device includes a body having at least one prong configured to be connected to an AC power source and a docking connector configured to receive a portable media player for charging.

In yet a further aspect of the disclosure, a cordless charging device includes a body having a docking connector configured to receive a portable media player for charging, and a light configured to operate independently of the portable media player being charged.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE FIGURES

Various aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. In describing any of these embodiments, the term "exemplary" may be used, which means "serving as an example, instance, or illustration," and should not necessarily be construed as preferred or advantageous over other embodiments disclosed herein. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

The cordless charging device is compact and portable so that it can easily be stowed for transport, greatly enhancing a consumer's ability to use the primary portable media player without all of the problems associated with recharging, including the associated wires or cables that inevitably accompany a docking station device.

Figure 1:
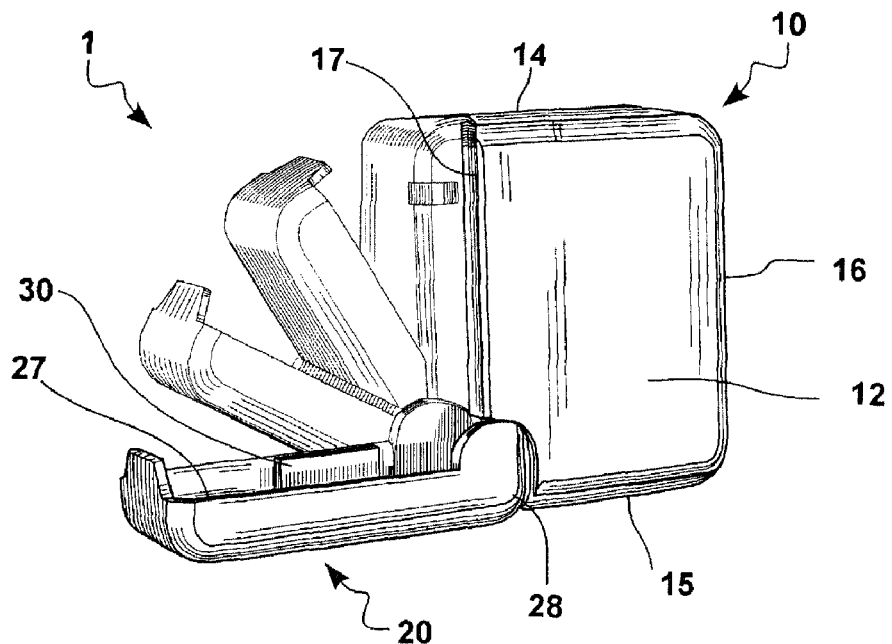
FIG. 1 shows an exemplary diagram of the hinged arm that radially releases from the body of the cordless charging device to reveal a docking connector.
Figure 2:
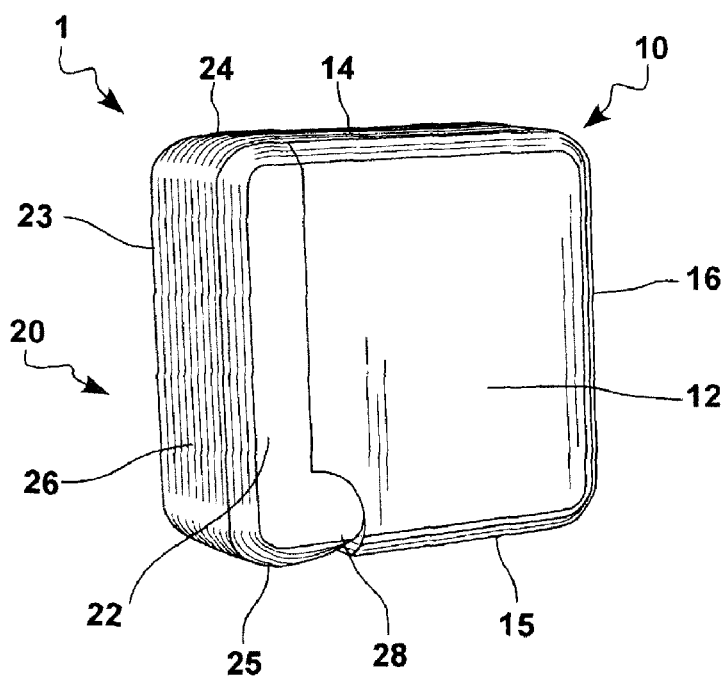
FIG. 2 shows an exemplary diagram of the cordless charging device with the hinged arm in the closed position for easy transport.
Figure 3:
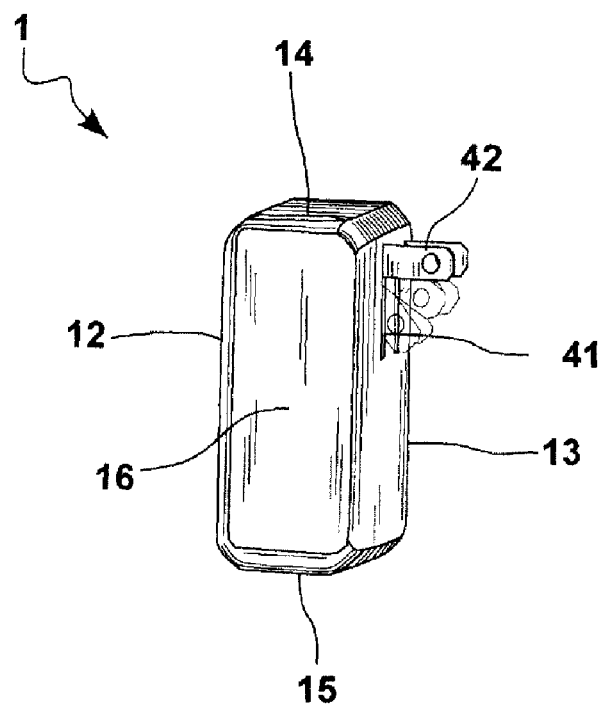
FIG. 3 presents an exemplary diagram of the collapsible prongs for plugging into a power source.

Portable media players (PMPs) are portable devices that can play or store some form of digital media. Referring to FIGS. 1-3, depicted therein is an embodiment of a cordless charging device 1 for recharging the batteries of portable media players. The cordless charging device includes a body 10. The body comprises a hinged arm 20 that radially releases to reveal a docking connector 30 and collapsible prongs 42 for plugging directly into an AC power source.

As shown in FIGS. 1-3, the cordless charging device 1 is formed so that when the hinged arm 20 and the collapsible prongs 42 are received into the body 10, the overall shape of the charger is primarily that of a small square box of reduced depth with rounded corners and beveled edges. The compact design allows for easy stowing and transport of the cordless charging device in a manner that also prevents tearing and snagging. The cordless charging device can alternatively be formed in many shapes and sizes in response to, for example, market demand or future PMP configurations.

The body 10 comprises a case that encloses the electrical circuitry for propagating the necessary electrical current from the AC power source to a docking connector 30 on the hinged arm 20 of the cordless charging device in order to charge a PMP battery. The circuitry includes an AC to DC converter (not shown) for supplying current, preferably in the range of 1 Amp, to the docking connector 30. The case may be made of nonconductive material with a textured finish and includes a rectangular-shaped front surface 12 and rear surface 13 connected along beveled edges by a top surface 14, bottom surface 15, an exterior side surface 16 and an interior side surface 17.

Figure 4:
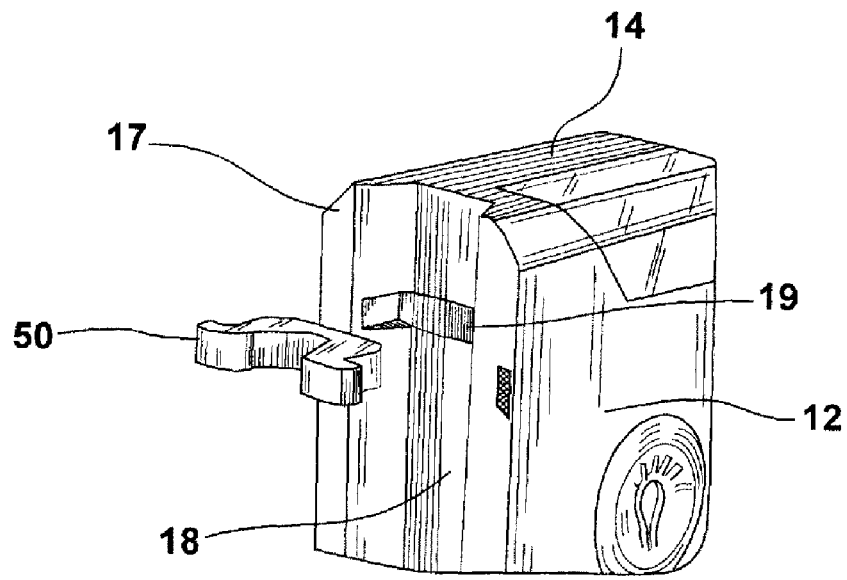
FIG. 4 contains a representative diagram of the recessed channel in the body of the cordless charging device wherein foam adapter inserts may be inserted into the corresponding insertion slot in the body of the charger.

The case is white but can be any color to appeal to an individual's taste. The case can be formed by a combination of two molded shells or any other method of forming an enclosure to house the interior electrical circuitry, as is well known in the art. The interior side surface 17, as depicted in FIG. 4, directly abuts the hinged arm of the device when the arm is in the closed position. The interior side surface 17 has a recessed channel 18 that runs along its length that is both wide enough and deep enough to accept and protect a docking connector 30 that may be mounted on the hinged arm, when the hinged arm is rotated to the closed position. The interior side surface also has a slot 19 formed in the upper portion of the recessed channel for receiving adapter inserts 50 that nest into the slot on the body. These adapter inserts can be made of die-cut, closed cell foam or any moldable nonconductive material that can be easily inserted and effectively held in the slot. The interior side 17 and top surfaces 14 are formed so as to accept the hinged arm 20 including, in an embodiment, a locking mechanism on the free end of the arm to prevent the arm from easily swinging open. The rear surface 13 of the body is formed with a recess 41 to accept the collapsible prongs 42.

An embodiment, as shown in FIG. 3, includes two prongs 42 arranged horizontally that collapse downward into a recess 41 of the rear surface 13 of the body. Alternative configurations include, among others, three or more prongs, prongs arranged horizontally or vertically, or prongs that are rotatable and collapsible. The collapsible prongs 42 are connected to the electrical circuitry enclosed in the body (not shown) for providing a charging current to the docking connector 30.

As shown in FIG. 1, the hinged arm 20 radially releases from the body 10 of the device to reveal a docking connector 30. The hinged arm 20 is attached to the body 10 so as to open in a radially downward motion from an axis that runs from the front surface 12 to the rear surface 13 of the body and parallel and in proximity to the bottom surface 15 and interior side surface 17 of the body 10. FIG. 1 illustrates a device designed to prevent rotation of the hinged arm 20 past a point 90° from the closed position, but the device can be designed so that the hinged arm 20 may rotate to any position, or multiple positions, so as to present the docking connector 30. This can be done with the assistance of detents 28 formed on the hinged arm 20 that operate alone or in combination with other features of the hinge to restrict motion beyond a certain point. Various embodiments of a hinge can be used such as a spring hinge with sufficient spring force to keep the arm open at a 90° position once released from the closed position. The hinged arm 20 and the hinge work together to provide stability and support in receiving an applied load when the PMP is fitted onto the docking connector 30.

As shown in FIGS. 1 and 2, the hinged arm 20 has a case including, when closed, a front surface 22 and back surface 23 connected along beveled edges by a top surface 24, bottom surface 25, an exterior side surface 26 and a charging seat surface 27 that forms the interior side of the arm when the arm is closed or at a position of 0° rotation. The top surface 24 which forms the free end of the arm when in the open position is formed with a lock tab or similar means for mating and locking the arm to the body of the charging device when closed. Other embodiments can include any variety of closing or locking mechanisms with the means for accomplishing this located anywhere along the abutting surfaces of the arm and the body.

Figure 6:
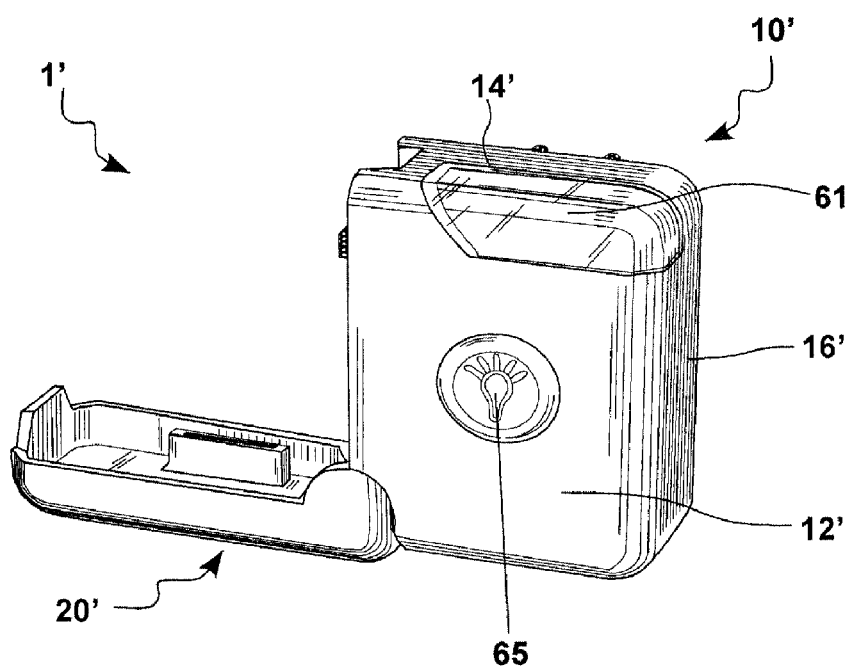
FIG. 6 shows an exemplary diagram of the hinged arm that radially releases from the body of the cordless charging device with integrated light and associated on/off button.

As seen in FIGS. 1 and 6, there are many additional features of a hinged arm that can be formed in alternative embodiments to aid in the user's ability to naturally align the PMP with the docking connector by providing the appearance of a docking terminal. These features may also be designed to provide added support in the retention of the PMP while docked so as to relieve stress placed on the docking connector 30. Additional features may include flanged frontal or rear surfaces of the hinged arm as well as forming the charging seat surface by recess or angle to help direct and support the PMP as it is cradled in the docked position.

As seen in FIG. 1, the cordless charger 1 is plugged into a wall outlet and the hinged arm 20 is rotated to the open position at 90°. The PMP is placed onto the docking connector 30 and is physically supported by the combination of the hinged arm surface features, the interior recessed channel 18 of the body, possibly an adapter insert 50, and the docking connector 30.

The docking connector 30 is a standard thirty pin connector with a select number of pins dedicated to supplying an electrical charge to the PMP battery when docked. As shown in FIGS. 1 and 6, the docking connector 30 is joined to the center portion of the charging seat surface 27 in a lengthwise fashion along the axis of the arm. The docking connector 30 may be slightly recessed into the charging seat surface 27 to promote support of the PMP when docked.

Figure 5:
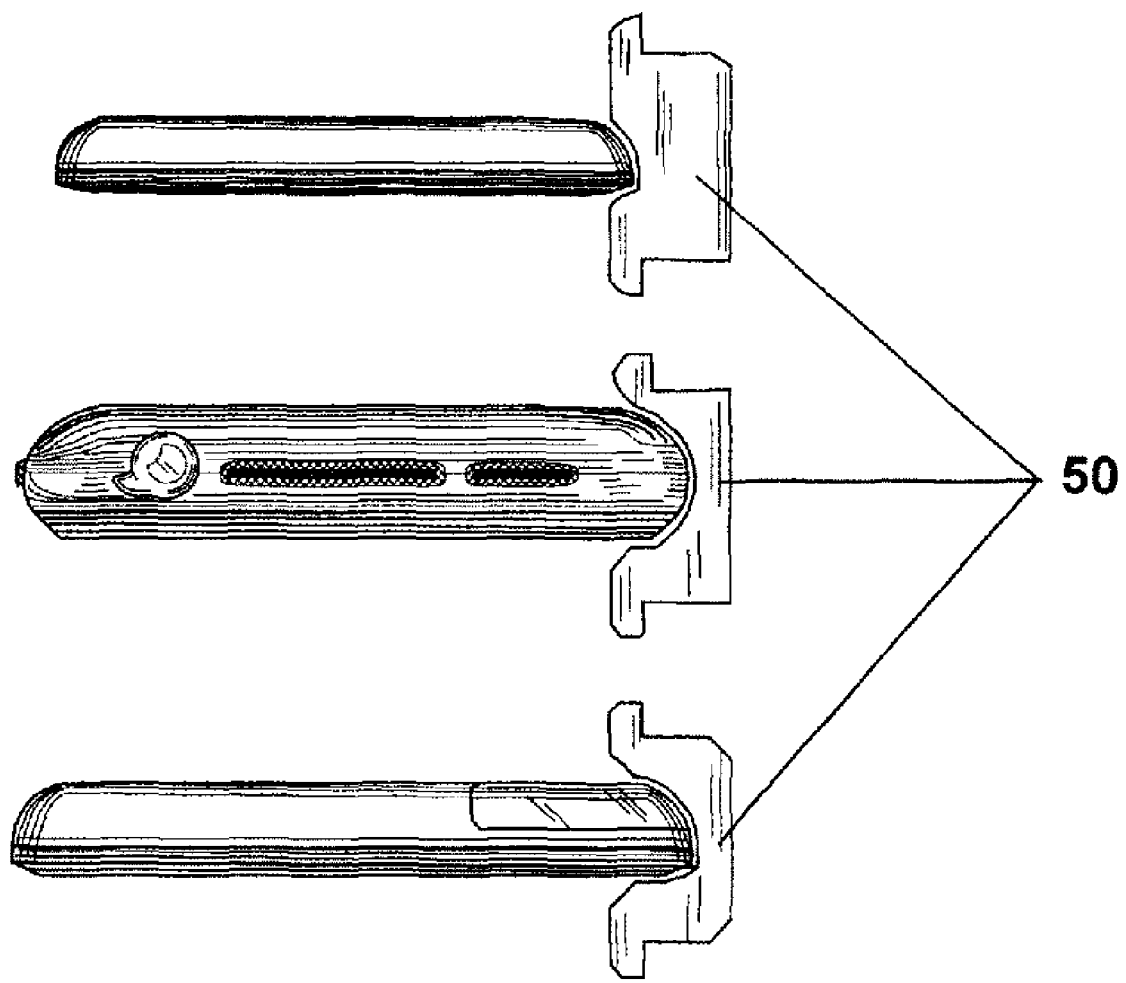
FIG. 5 shows various exemplary embodiments of the foam adapter inserts cradling different size portable media players.

In alternative embodiments, the device has different adapter inserts 50 that nest into a slot 19 on the charger body. As shown in FIG. 4, these adapters slide into a slot 19 in the recessed channel 18 of the interior side surface 17 of the body 10. The inserts 50 are formed to correspond to the dimensional aspects of various PMPs and can be made of die-cut, closed cell foam or any other material that can be easily formed to insert and effectively hold the PMPs. See FIG. 5 for various embodiments of the adapter insert feature.

Figure 7:
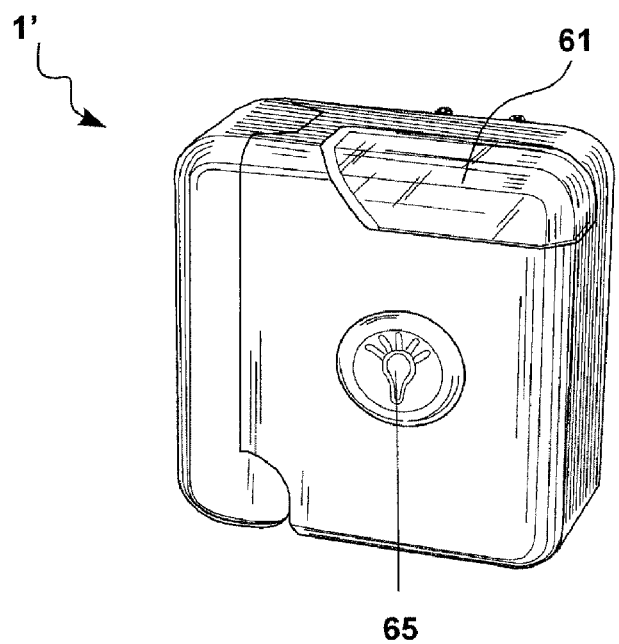
FIG. 7 shows an exemplary diagram of the cordless charging device with the hinged arm in the closed position for easy transport and with the integrated light and associated on/off button.

In another embodiment, a cordless charging device (1') is as described above but with a built-in light. As shown in FIGS. 6 and 7, a lens 61 is integrally added to the body 10' which encloses a light emitting component. The dimensions of the lens can be adjusted to permit more or less light to be transmitted or focused in particular directions as required. An embodiment of this feature would use Light Emitting Diode (LED) technology because of the reduced current requirements and the lower level of lighting generally desirable in a light that may be used at night. But any soft glow lighting mechanism may be incorporated. The light electrical circuitry is housed in the body 10' with an integrated, textured rubber on/off push button 65 centrally located on the front surface 12' of the body 10'.

In yet another embodiment, the cordless charging device includes a light, preferably LED, that indicates to the user when the PMP is charging.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A cordless charging device, comprising:
a body having at least one prong configured to be connected to an AC power source and a docking connector configured to receive a portable media player, the docking connector being electrically connected to said at least one prong,
wherein the body further comprises:
a recessed channel configured to receive the docking connector; and
a hinged arm supporting the docking connector, the hinged arm being configured to extend over the recessed channel and to release radially from the body to extend perpendicularly to the recessed channel, the hinged arm and the recessed channel being configured to provide separate support to a portable media player.

2. The charging device of claim 1, wherein the body further comprises a recess, and wherein the at least one prong is configured to collapse into the recess.

3. The charging device of claim 1, wherein the docking connector comprises a 30 pin connector.

4. The charging device of claim 1, wherein the body further comprises a light configured to operate independently of the portable media player being received by the docking connector.

5. The charging device of claim 4, wherein the light comprises a lens formed with the body, the lens enclosing a light emitting component.

6. The charging device of claim 5, wherein the light emitting component comprises a Light Emitting Diode (LED).

7. The charging device of claim 5, wherein the body further comprises an on/off button electrically connected with the light emitting component and the at least one prong.

8. The charging device of claim 1, wherein the hinged arm further comprises detents configured to prevent rotation of the hinged arm past a predefined point.

9. The charging device of claim 1, wherein the recessed channel further comprises a slot and the charging device further comprises an adapter insert within the slot for engaging and supporting the portable media player.

10. The charging device of claim 9, wherein the adapter insert is made of die-cut, closed cell foam.

11. A method for charging a portable media player with a wireless charging device comprising a body having at least one prong and a docking connector electrically connected to said at least one prong, wherein the body further comprises: a recessed channel configured to receive the docking connector; and a hinged arm supporting the docking connector, the hinged arm being configured to extend over the recessed channel and to release radially from the body to extend perpendicularly to the recessed channel, the hinged arm and the recessed channel being configured to provide separate support to a portable media player, the method comprising:
connecting said at least one prong to an AC power source; and
placing a portable media player onto the docking connector.

12. The method of claim 11, wherein the body further comprises a recess, the method further comprising releasing the at least one prong from the recess.

13. The method of claim 11, the method further comprising rotating the hinged arm radially from the body.

14. The method of claim 11, wherein the recessed channel has a slot, the method further comprising inserting an adapter insert into the slot to engage and to support the portable media player.

15. The method of claim 11 wherein the body further comprises a light and wherein the wireless charging device further comprises an on/off button, the method further comprising pressing the on/off button to activate a light.

16. A cordless charging device, comprising:
a body having at least one prong configured to be connected to an AC power source and a docking connector configured to receive a portable media player for charging,
wherein the body further comprises:
a recessed channel configured to receive the docking connector; and
a hinged arm supporting the docking connector, the hinged arm being configured to extend over the recessed channel and to release radially from the body to extend perpendicularly to the recessed channel, the hinged arm and the recessed channel being configured to provide separate support to a portable media player.

17. The charging device of claim 16, wherein the body further comprises a recess, and wherein the at least one prong is configured to collapse into the recess.

18. The charging device of claim 16, wherein the docking connector comprises a 30 pin connector.

19. The charging device of claim 16, wherein the body further comprises a light configured to operate independently of the portable media player being charged.

20. The charging device of claim 19, wherein the light comprises a lens formed with the body and a light emitting component enclosed by the lens.

21. The charging device of claim 20, wherein the light emitting component comprises a Light Emitting Diode (LED).

22. The charging device of claim 20, wherein the body further comprises an on/off button configured to control the light emitting component.

23. The charging device of claim 16, wherein the hinged arm further comprises detents configured to prevent rotation of the hinged arm past a predefined point.

24. The charging device of claim 16, wherein the recessed channel further comprises a slot and the charging device further comprises an adapter insert within the slot for engaging and supporting the portable media player.

25. The charging device of claim 24, wherein the adapter insert is made of die-cut, closed cell foam.

26. A cordless charging device, comprising:
a body having a docking connector configured to receive a portable media player for charging, and a light configured to operate independently of the portable media player being charged, wherein the body further comprises:
- a recessed channel configured to receive the docking connector; and
- a hinged arm supporting the docking connector, the hinged arm being configured to extend over the recessed channel and to release radially from the body to extend perpendicularly to the recessed channel, the hinged arm and the recessed channel being configured to provide separate support to a portable media player.

27. The charging device of claim 26, wherein the body further comprises at least one prong configured to be connected to an AC power source.

28. The charging device of claim 27, wherein the body further comprises a recess, and wherein the at least one prong is configured to collapse into the recess.

29. The charging device of claim 26, wherein the docking connector comprises a 30 pin connector.

30. The charging device of claim 26, wherein the light comprises a lens formed with the body and a light emitting component enclosed by the lens.

31. The charging device of claim 30, wherein the light emitting component comprises a Light Emitting Diode (LED).

32. The charging device of claim 31, wherein the body further comprises an on/off button configured to control the light emitting component.

33. The charging device of claim 26, wherein the hinged arm further comprises detents configured to prevent rotation of the hinged arm past a predefined point.

34. The charging device of claim 26, wherein the recessed channel further comprises a slot and the charging device further comprises an adapter insert for engaging and supporting the portable media player.

35. The charging device of claim 34, wherein the adapter insert is made of die-cut, closed cell foam.

* * * * *